United States Patent Office 3,050,485
Patented Aug. 21, 1962

3,050,485
METHOD FOR CURING ORGANOPOLYSILOXANE COMPOSITIONS WITH SULFUR-CONTAINING COMPOUNDS WHICH ARE REDUCIBLE BY NASCENT HYDROGEN
Siegfried Nitzsche and Manfred Wick, Burghausen, Upper Bavaria, Germany, assignors to Wacker-Chemie G.m.b.H., Munich, Bavaria, Germany
No Drawing. Filed July 16, 1958, Ser. No. 748,790
Claims priority, application Germany July 27, 1957
2 Claims. (Cl. 260—29.1)

This invention relates to a method of converting compositions based on organopolysiloxane polymers to elastomers.

It is known to prepare organopolysiloxane elastomers, widely known as silicone rubbers, by employing polyfunctional organosilicon compounds and condensation catalysts to effect cross linking of diorganosiloxane polymers (U.S. application Serial No. 602,081, filed August 3, 1956). In this system, short vulcanizing times and low vulcanization temperatures can be achieved by employing an organohydrogenpolysiloxane as the polyfunctional organosilicon compound. Low vulcanizing temperature and rapid vulcanization are of particular importance in applications such as for taking dental impressions or other anatomical impressions. Such impressions or molds are filled with plaster or other molding materials which are then allowed to cure or set up. However, when the organohydrogensiloxane is employed in the system, there is an evolution of hydrogen during vulcanization and curing and for some time thereafter. This hydrogen evolution causes blisters and cavities on the surface of the plaster or other molding compound. Thus, it is necessary to take the impression and then store the mold until all of the hydrogen evolution has occurred. This takes 12 to 24 hours and may take up to 48 hours in some cases.

The evolution of hydrogen noted when organohydrogensiloxanes are employed can be avoided by using organopolysiloxane materials with relatively large amounts of filler, preferably alkaline fillers. However, such heavily filled silicone rubber stocks suffer the disadvantage that they are too immobile. They do not have sufficient fluidity to give an accurate impression. As a result, the mold and recast of the impression are not useful because they are not accurate.

It is the object of this invention to produce an organopolysiloxane composition useful for taking anatomical impressions and especially dental impressions. Another object is to prepare a novel room temperature vulcanizing silicone rubber stock. Further objects and advantages of this invention are detailed in or will be obvious from the specification and claims.

In accordance with this invention, a room temperature vulcanizing silicone rubber composition is prepared by admixing (1) a diorganosiloxane polymer, (2) an organohydrogensiloxane polymer, (3) a condensation catalyst and (4) a small quantity of a material which is reducible by nascent hydrogen.

The diorganosiloxane polymers which are operative herein are the basic and predominant ingredient in the silicone rubbers prepared. These polymers have the general formula $ZO[R_2SiO]_nZ$ where each R represents a monovalent hydrocarbon radical or an halogenated monovalent hydrocarbon radical, each Z is hydrogen, a monovalent hydrocarbon radical or a halogenated monovalent hydrocarbon radical and $n$ has an average value of at least 50. The organic substituents along the polymer chain are prepresented by R and can be any monovalent hydrocarbon or halogenated monovalent hydrocarbon radical. Examples of the radicals R can represent are alkyl radicals such as methyl, propyl and octadecyl; aryl radicals such as phenyl and anthracyl; alkaryl radicals such as tolyl and methylnaphthyl; aralkyl such as benzyl and phenylethyl; cycloaliphatic such as cyclopropyl and cyclopentyl; alkenyl such as vinyl and octadecenyl; and halogenated radicals such as 3,3,3-trifluoropropyl, trifluoromethylphenyl ($F_3CC_6H_4-$), chlorophenyl, perfluorovinyl, bromodichloromethyl, and so forth. The end-blocking group (—OZ) can be a hydroxyl group, i.e. Z is hydrogen, or it can be a hydrocarbonoxy group where Z is a monovalent hydrocarbon radical or halogenated monovalent hydrocarbon radical as defined and illustrated above. The preferred materials are those wherein each R is a lower alkyl radical of less than 6 carbon atoms or a phenyl radical and each Z is a hydrogen atom. These polymers can vary from fluids of low viscosity to high polymeric gums (i.e. viscosity at 25° C. of 50 cs. to 10,000,000 cs.). The average ratio of organic substituents to silicon atoms in the operable organosiloxane polymers is from 1.95 to 2.05. Minor amounts of $RSiO_{3/2}$ units and $R_3SiO_{1/2}$ units can be present in the polymer so long as the average R/Si ratio remains within the prescribed range. Methods of preparing such polymers are well known and are adequately described in the art.

The second ingredient in this invention is an organohydrogensiloxane polymer. This polymer has the average unit formula

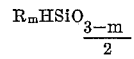

where R is as above defined and $m$ has an average value between 0 and 2. It is preferred that methyl hydrogensiloxanes where $m$ has an average value of about 1 be used. Such materials are known and methods of preparing them are known. Preferred species are the liquid polymers which can be readily dispersed throughout the ultimate mixture.

The third ingredient employed is a condensation catalyst. Operable catalysts include organometallic compounds such as dibutyl tin dilaurate, dibutyl tin dimaleinate, zinc octoate and phenyl mercuric acetate, metal chelates, metal oxides, acids such as boric acid and oleic acid, and basic materials such as triethanolamine and dibutylamine. The preferred catalysts, because they are non-toxic and give superior results, are organotin compounds such as dibutyl tin dilaurate and dibutyl tin dimaleinate.

The fourth ingredient employed herein is a compound which is reducible by nascent hydrogen. Sulfur, selenium, tellurium and oxygen and their compounds, particularly those compounds which are readily reduced by nascent hydrogen, are operable herein.

The oxygen compounds which are particularly useful are the organic and inorganic peroxides. Alkyl, aryl, acyl, acylalkyl and acylaryl peroxides are examples of the operable organic peroxides. Inorganic peroxides such as magnesium peroxides, barium peroxide, and bismuth peroxide can also be employed.

Sulfur and sulfur compounds are unusually effective herein. Operable sulfur compounds include thiocetamide, thiourea, organodisulfides such as dibenzyldisulfide, organic thioethers such as diphenylsulfide, organosulfoxides such as dibutylsulfoxide, sulfones such as 4,4'-diaminodiphenylsulfone, organic sulfonic and sulfinic acid esters such as paratoluolsulfonic acid methyl ester, isothiocyanates such as phenylisothiocyanates, thiuram compounds such as tetramethylthiuram disulfide and tetramethylthiuram monosulfide, mercaptans and salts of mercaptans such as mercaptobenzothiazole and its zinc salt, sulfenamides such as N-cyclohexylbenzothiazyl-2-sulfenamide, salts of organosubstituted thiocarbamic acids and dithiocarbamic acids such as ethylphenyldithiocarbamic acid zinc, and xanthogenate.

Tellurium and compounds of tellurium can be employed herein. The suitable compounds of tellurium are such as tellurium dioxide, tellurous acid, organic tellurium compounds such as the tellurium diethyl dithiocarbaminate known commercially as "Tellurac." Suitable selenium compounds are selenium dioxide, selenious acid and organo-selenium compounds such as the selenium dimethyldithiocarbaminate known commercially as "methylselenac." Also useful are the compounds, reducible by nascent hydrogen, of group 5A of the periodic system, especially phosphorous, arsenic and antimony compounds.

The silicone rubber stocks of this invention can contain fillers. A wide variety of fillers are known and employed in silicone rubber stocks. Mica dust, diatomaceous earth, carbon blacks, ground chalk, silica aerogels, silica xerogels, fume silica, asbestos, zinc sulfide, barium titanate, Fiberglas floc, iron oxide, zinc oxide, titania, magnesia, micronized graphite, micronized slate, $PbO_2$, PbO, alumina, and many other known fillers for silicone rubber are operable herein. The filler is added in amounts of 20 to 150 parts by weight of filler per 100 parts by weight of diorganosiloxane polymer (1).

Other known anti-oxidants, pigments, compression set additives, and additives to improve specific properties of the silicone rubbers can be added to the silicone rubber stocks of this invention without departing from the scope of this invention. A preferred method of operation is to admix the diorganosiloxane polymer, organohydrogensiloxane fluid and any filler and other additives on a mill. The condensation catalyst is then admixed with sufficient of the reducible material (e.g. sulfur or alkylperoxide) to form a saturated solution of reducible material in the catalyst, and this mixture is added to and blended in the silicone rubber stock which then starts to vulcanize.

The room temperature vulcanizing silicone rubber stocks of this invention are prepared by mixing the various ingredients. Mixing can be accomplished in any order and by any desired means such as on a mill or in a commercial mixer. The relative proportions of ingredients employed can vary over a wide range. However, the best results are obtained by adding to each 100 parts by weight of diorganosiloxane polymer (1), .5 to 20 parts by weight of organohydrogensiloxane (2), 0.1 to 5 parts by weight of condensation catalyst (3), and 0.1 to 10 parts by weight of the reducible material (4). Fillers and other additives are added in conventional amounts.

The choice of materials employed may be dependent upon the use to be made of the rubber stock. Thus, if dental impressions are to be made from the stock, non-toxic ingredients are required.

The following examples are included to aid those skilled in the art to better understand and practice this invention. The scope of the invention is not restricted by the examples and is properly delineated in the appended claims. All parts and percentages in the examples are based on weight unless otherwise specified.

*Example 1*

A silicone rubber stock was prepared by admixing 100 parts of a hydroxyl end-blocked dimethylsiloxane polymer having a viscosity at 25° C. of 28 cs., 4 parts of methylhydrogensiloxane fluid, and 50 parts calcinated diatomaceous earth as filler. The condensation catalyst was dibutyl tin dilaurate which was mixed with tetraethylsilicate as a carrier in the ratio of 1 part tin compound to 3 parts silicate. 1.5 parts of the condensation catalyst mixture was added to 10 parts of the silicone rubber stock and the mixture was used to take an impression in an oral cavity. This procedure was repeated to obtain a number of impressions and the impressions were filled with plaster of Paris to make casts. Some impressions were filled after 5 minutes' standing outside the oral cavity while others aged 15, 30 and 60 minutes and still others were allowed to stand 4, 6, 8 and 12 hours before filling with plaster of Paris. The plaster casts obtained were blistered and presented porous surfaces even after aging for 8 hours. Only by permitting the impression to age for 12 hours could a non-blistered, smooth, and accurate cast be obtained.

The above experiment was repeated but the condensation catalyst was modified by adding sufficient sulfur thereto to obtain a saturated solution. The dental impressions taken with this silicone rubber material gave smooth, unblistered accurate casts after only 5 minutes aging outside the oral cavity.

*Example 2*

A master batch of silicone rubber stock was prepared by admixing 100 parts hydroxyl end-blocked dimethylsiloxane (average molecular weight of 87,000), 50 parts calcinated diatomaceous earth and 4 parts methylhydrogensiloxane fluid. A mixture of 1 part dibutyl tin dilaurate and 3 parts tetraethylsilicate was also prepared and .2 part of diethyldithiocarbamic acidified tellurium was dissolved therein. 1.7 parts of the mixture of curing catalyst, silicate and tellurium compound was added to 100 parts of the master batch and antomical impressions were taken. Each of the impressions taken gave accurate, smooth casts which were free of bubbles and were non-porous after 5 minutes of aging.

*Example 3*

Employing the master batch of Example 2, equivalent amounts of cyclohexanone peroxide, di-tert-butylperoxide, tetramethylthiuramdisulfide, mercaptobenzothiazole, zinc xanthogenate, and dibenzyldisulfide were each substituted for the tellurium compound admixed with the curing catalyst and silicate. The impressions and ultimate casts taken with the resulting mixtures were equivalent to those obtained in Example 2.

*Example 4*

Equivalent results are obtained employing selenium dioxide or selenium dimethyldithiocarbaminate in place of the tellurium compound in the composition of Example 2.

*Example 5*

Equivalent results are obtained employing as the diorganosiloxane polymer a methoxy end-blocked copolymer of 10 mol percent phenylmethylsiloxane units and 90 mol percent dimethylsiloxane units in the method of Example 1.

*Example 6*

Equivalent results were obtained substituting dibutyl tin dimaleinate as the curing catalyst in the method of Example 3.

That which is claimed is:

1. A method of preparing a silicone rubber consisting of admixing (1) an essentially diorganosiloxane polymer of the formula $ZO(R_xSiO)_nZ$ where each R is selected from the group consisting of monovalent hydrocarbon radicals and halogenated monovalent hydrocarbon radicals, each Z is selected from the group consisting of hydrogen atoms, monovalent hydrocarbon radicals and halogenated monovalent hydrocarbon radicals, $x$ has an average value of from 1.95 to 2.05 and $n$ has a value of at least 50, (2) an organohydrogensiloxane fluid of the average unit formula $$R_mHSiO_{\frac{3-m}{2}}$$

where R is as above defined and $m$ has an average value in the range of 0 to 2 inclusive, (3) a condensation catalyst selected from the group consisting of dibutyl tin dilaurate and dibutyl tin dimaleinate and (4) a minor proportion of a sulfur containing compound easily reducible by nascent hydrogen selected from the group consisting of thiocetamide, thiourea, dibenzyldisulfide, diphenylsulfide, dibutylsulfoxide, 4,4'-diaminodiphenylsulfone, paratoluolsulfonic acid methyl ester, phenylisothiocyanates, tetramethylthiuram disulfide, tetramethylthiurammonosulfide, mercaptobenzothiazole, zinc salt of mercaptobenzothiazole, N-cyclohexylbenzothiazyl-2-sulfenamide, ethylphenyldithiocarbamic zinc, tellurium diethyldithiocarbaminate and selenium dimethyldithiocarbiminate, and exposing the mixture to the atmosphere at room temperature.

2. The method of preparing a silicone rubber consisting of mixing a diorganosiloxane polymer of the formula $HO(R_2SiO)_nH$ wherein each R is a monovalent hydrocarbon radical and $n$ has an average value of at least 50, a methylhydrogensiloxane of the unit formula $CH_3SiHO$, an organotin compound selected from the group consisting of dibutyl tin dilaurate and dibutyl tin dimaleinate and a minor proportion of tellurium diethyldithiocarbamate.

References Cited in the file of this patent
UNITED STATES PATENTS

| | | |
|---|---|---|
| 2,448,556 | Sprung | Sept. 7, 1948 |
| 2,713,564 | Pfeifer et al. | July 19, 1955 |
| 2,728,692 | Dennett | Dec. 27, 1955 |
| 2,814,601 | Currie et al. | Nov. 26, 1957 |
| 2,927,870 | Beutler | Mar. 8, 1960 |